(12) United States Patent
Matsumoto et al.

(10) Patent No.: US 7,897,283 B2
(45) Date of Patent: Mar. 1, 2011

(54) NON-AQUEOUS SECONDARY BATTERY-USE GRAPHITE COMPOSITE PARTICLE, CATHODE ACTIVE SUBSTANCE MATERIAL CONTAINING IT, CATHODE AND NON-AQUEOUS SECONDARY BATTERY

(75) Inventors: Hitoshi Matsumoto, Kagawa (JP); Hideharu Satoh, Ibaraki (JP)

(73) Assignees: Mitsubishi Chemical Corporation, Tokyo (JP); Tokai Carbon Co., Ltd., Tokyo (JP)

( * ) Notice: Subject to any disclaimer, the term of this patent is extended or adjusted under 35 U.S.C. 154(b) by 617 days.

(21) Appl. No.: 11/993,902

(22) PCT Filed: Jun. 26, 2006

(86) PCT No.: PCT/JP2006/312758
§ 371 (c)(1),
(2), (4) Date: Feb. 27, 2008

(87) PCT Pub. No.: WO2007/000982
PCT Pub. Date: Jan. 4, 2007

(65) Prior Publication Data
US 2009/0130561 A1    May 21, 2009

(30) Foreign Application Priority Data
Jun. 27, 2005   (JP) .................. P.2005-186597

(51) Int. Cl.
*H01M 4/58* (2010.01)
(52) U.S. Cl. ............... 429/231.8; 429/218.1; 252/182.1
(58) Field of Classification Search ............... 429/231.8, 429/231.7, 218.1; 252/182.1, 502; 423/448
See application file for complete search history.

(56) References Cited

U.S. PATENT DOCUMENTS 6,632,569 B1 * 10/2003 Kameda et al. .......... 429/231.8
2002/0009643 A1 * 1/2002 Torata et al. ................ 429/223
2002/0061445 A1  5/2002 Kitagawa et al.
2006/0172201 A1 * 8/2006 Yasukawa et al. ........... 429/329

FOREIGN PATENT DOCUMENTS

| CN | 1574430 A   | 2/2005  |
|----|-------------|---------|
| EP | 1 717 832 A1| 11/2006 |
| JP | 10 330107   | 12/1998 |
| JP | 10 334915   | 12/1998 |
| JP | 11 11919    | 1/1999  |
| JP | 2000 86343  | 3/2000  |
| JP | 2000 182617 | 6/2000  |
| JP | 2002 367611 | 12/2002 |
| JP | 2004 210634 | 7/2004  |

OTHER PUBLICATIONS

U.S. Appl. No. 12/521,372, filed Jun. 26, 2009, Matsumoto, et al.

* cited by examiner

*Primary Examiner*—Raymond Alejandro
(74) *Attorney, Agent, or Firm*—Oblon, Spivak, McClelland, Maier & Neustadt, L.L.P.

(57) ABSTRACT

To provide a nonaqueous secondary battery ensuring that a charge-discharge irreversible capacity at an initial cycle is sufficiently small even when an active material layer comprising a negative electrode active material on a current collector is increased in a density for obtaining a high capacity.

This object is attained by a graphite composite particle for a nonaqueous secondary battery, which satisfies the requirements (1) and (2):

(1) $D_L/D_S$ is more than 1 and 2 or less, wherein $D_L$ μm means a volume-based median size measured by a laser diffraction/scattering-type particle size distribution measuring apparatus, and $D_S$ μm means an average circle-equivalent particle size which is determined from a measured area S of particles each having a contour not overlapped with a contour of another particle in a SEM; and (2) a Raman R value is 0.04 or more and 0.14 or less, wherein the Raman R value means an intensity ratio $I_B/I_A$ between an intensity $I_A$ of a maximum peak of 1580 $cm^{-1}$ around and an intensity $I_B$ of a maximum peak of 1360 $cm^{-1}$ around in a Raman spectrum.

10 Claims, No Drawings

NON-AQUEOUS SECONDARY BATTERY-USE GRAPHITE COMPOSITE PARTICLE, CATHODE ACTIVE SUBSTANCE MATERIAL CONTAINING IT, CATHODE AND NON-AQUEOUS SECONDARY BATTERY

TECHNICAL FIELD

The present invention relates to a graphite composite particle for use in a nonaqueous secondary battery, a negative electrode active material comprising the graphite composite particle, a negative electrode formed by using the negative electrode active material, and a nonaqueous secondary battery comprising the negative electrode. More specifically, the present invention relates to a graphite composite particle, a negative electrode active material, a negative electrode and a nonaqueous secondary battery, which can achieve a high capacity and a small charge-discharge irreversible capacity.

BACKGROUND ART

With recent reduction in size of an electronic device, a demand for a high-capacity secondary battery is increasing. Particularly, a nonaqueous secondary battery having a higher energy density than a nickelcadmium battery or a nickelhydrogen battery is attracting attention.

As for a negative electrode active material of a nonaqueous secondary battery, graphite is often used in view of a cost, a durability and a capacity. However, when an active material layer comprising the negative electrode active material on an electrode is increased in a density for obtaining a high capacity, there arises a problem that a charge-discharge irreversible capacity at an initial cycle increases.

Patent Document 1 describes a production method of a carbon composite material, where natural graphite and a binder are kneaded to obtain a kneaded material, and the binder is carbonized by primary heating at 700 to 1,500° C., and subsequently secondary heating at 2,400 to 3,000° C. is performed, and then a purification of the natural graphite and a graphitization of the carbonized binder are simultaneously performed. However, in Patent Document 1, vein or flake natural graphite is envisaged as a starting material, and a increase in a density of an active material layer and a decrease in a charge-discharge irreversible capacity are insufficient.

Patent Document 1: JP-A-2000-086343 (the term "JP-A" as used herein means an "unexamined published Japanese patent application")

DISCLOSURE OF THE INVENTION

Problems that the Invention is to Solve

Under these circumstances, the present invention has been made and an object of the present invention is to provide a nonaqueous secondary battery ensuring that a charge-discharge irreversible capacity at an initial cycle is sufficiently small even when an active material layer comprising a negative electrode active material on a current collector is increased in a density for obtaining a high capacity.

Means for Solving the Problems

As a result of intensive studies to attain the above-described object, the present inventors have been found that a nonaqueous secondary battery capable of attaining the above objects can be obtained by using a graphite composite particle in which a carbonaceous particle working out to a nucleus of a graphite composite particle is connected at a certain ratio in the final graphite composite particle, that is, a ratio between a median size determined by a laser scattering particle size distribution measurement and an average circle-equivalent particle size determined by an observation using a scanning electron microscope is in a specific numerical range, and a Raman R value is in a specific range. The present invention has been accomplished based on this finding.

That is, the present invention provides a graphite composite particle for a nonaqueous secondary battery, which satisfies the following requirements (1) and (2):

(1) $D_L/D_S$ is more than 1 and 2 or less, wherein $D_L$ µm means a volume-based median size which is measured by suspending 10 mg of the particle in 10 mL of 0.2 mass % polyoxyethylene sorbitan monolaurate aqueous solution, introducing the suspension into a commercially available laser diffraction/scattering-type particle size distribution measuring apparatus, and irradiating the suspension with an ultrasonic wave of 28 kHz at a power of 60 W for 1 minute, and $D_S$ µm means an average circle-equivalent particle size which is determined by selecting 100 particles each having a contour not overlapped with a contour of another particle at an observation using a scanning electron microscope, and determining an average value of the circle-equivalent particle size of the 100 particles determined from a measured area S of individual particles according to $2\times(S/3.14)^{0.5}$; and (2) a Raman R value is 0.04 or more and 0.14 or less, wherein the Raman R value means an intensity ratio $I_B/I_A$ between an intensity $I_A$ of a maximum peak in the vicinity of 1580 cm$^{-1}$ and an intensity $I_B$ of a maximum peak in the vicinity of 1360 cm$^{-1}$ in a Raman spectrum.

Also, the present invention provides a negative electrode active material for a nonaqueous secondary battery, comprising: (A) the above-described graphite composite particle for a nonaqueous secondary battery; and if desired, (B) one or more kinds of carbonaceous active material particles selected from the group consisting of natural graphite, artificial graphite, amorphous coated graphite, resin-coated graphite and amorphous carbon.

Furthermore, the present invention provides a negative electrode for a nonaqueous secondary battery, comprising a current collector and an active material layer formed thereon, wherein said active material layer is formed by using at least the above-described negative electrode active material for a nonaqueous secondary battery.

In addition, the present invention provides a nonaqueous secondary battery comprising: an electrolyte; and positive and negative electrodes capable of occluding and releasing a lithium ion, wherein said negative electrode is the above-described negative electrode for a nonaqueous secondary battery.

Advantage of the Invention

By a use of the graphite composite particle for a nonaqueous secondary battery of the present invention, a high-capacity nonaqueous secondary battery assured of a small charge-discharge irreversible capacity at an initial cycle even when an active material layer on a current collector of negative electrode is increased in a density, can be provided.

BEST MODE FOR CARRYING OUT THE INVENTION

The best mode for carrying out the present invention is explained in detail below, but the following description of the constitutional requirement of the invention is one example (representative example) of the embodiments of the present invention, and as long as the purport of the present invention is observed, the present invention is not limited to these embodiments.

In the present invention, terms are defined as follows. That is, in the graphite composite particle of the present invention, a portion where a carbonaceous particle is calcined is sometimes referred to as a graphite particle. The carbonaceous composite particle of the present invention, including those mixed with, if desired, a carbonaceous active material particle, is defined as a negative electrode active material. The electrode having at least an active material layer on a current collector for a negative electrode, in which the active material layer is obtained by using at least a negative electrode active material and a binder, is defined as an electrode or a negative electrode. A nonaqueous secondary battery comprises at least a negative electrode, a positive electrode and an electrolyte.

[1] Negative Electrode Active Material for Nonaqueous Secondary Battery (A) Constitution of Graphite Composite Particle The negative electrode active material of the present invention mainly comprises the graphite composite particle of the present invention. The graphite composite particle of the present invention is obtained, for example, by kneading a carbonaceous particle and a graphitizable binder (hereinafter sometimes simply referred to as a "binder"); and either performing a graphitization after pulverizing a formed product of the kneaded material, or pulverizing after performing a graphitization of a formed product of the kneaded material. That is, in this case, the formed graphite composite particle is constructed to have a structure where a calcined binder (this is also graphite) connects to at least a part (a part or the entirety) of the graphite particle formed by calcining of a carbonaceous particle. Also, the graphite composite particle of the present invention includes one in which graphite particles are connected each other at a certain degree of ratio by the calcined binder (hereinafter, the term "graphite composite particle of the present invention" includes such a composite particle).

A carbonaceous particle as a raw material of the graphite composite particle of the present invention is not particularly limited as long as it is a carbon particle capable of being graphitized by calcining, but examples thereof include natural graphite, artificial graphite, spheronized graphite, coke powder, needle coke powder and resin carbide powder. Among these, natural graphite is preferred in that a density of an active material layer can be easily increased at a preparation of the active material layer, and spheronized graphite obtained by subjecting graphite to a spheronized treatment is particularly preferred.

The graphitizable binder is not particularly limited as long as it is carbonaceous capable of being graphitized by calcining, and petroleum-type and coal-type condensed polycyclic aromatics which is a tar and from a soft pitch to a hard pitch are preferably used. Specific examples thereof include a coal-type heavy oil such as an impregnating pitch, a coal tar pitch and a coal-liquefied oil, and a petroleum-type heavy oil such as a straight heavy oil (e.g., asphaltene) and a decomposition-type heavy oil (e.g., ethylene heavy end tar)

(B) Physical Properties of Graphite Composite Particle

The graphite composite particle of the present invention satisfies at least the following requirements (1) and (2).

(a) Requirement (1)

(i) Definition of Volume-based Median Size Determined by Laser Scattering Particle Size Distribution Measurement A volume-based median size measured in a measuring apparatus is defined as a volume-based median size $D_L$ μm in the present invention, which is measured by suspending 10 mg of the graphite composite particle in 10 mL of 0.2 mass % polyoxyethylene sorbitan monolaurate aqueous solution (for example, Tween 20 (registered trademark)) which is a surfactant; introducing the suspension into a commercially available laser diffraction/scattering-type particle size distribution measuring apparatus (for example, LA-920, manufactured by Horiba Ltd.); and irradiating the suspension with an ultrasonic wave of 28 kHz at a power of 60 W for 1 minute.

(ii) Definition of Average Circle-equivalent Particle Size Determined by Observation Though Scanning Electron Microscope (hereinafter Simply Referred to as "SEM")

At a SEM observation, 100 Particles each having a contour not overlapped with a contour of another particle are selected, and a circle-equivalent particle size is determined on the 100 particles from the measured area S of individual particles according to $2\times(S/3.14)^{0.5}$, and an average value thereof is defined as an average circle-equivalent particle size $D_S$ μm of the present invention. In some particles of which contour is overlapped with a contour of another particle, two or more carbonaceous particles may be connected and calcined together with a graphitizable binder to form one graphite composite particle. Therefore, such a particle is not included in the 100 particles. That is, the above 100 particles all are a particle formed by being calcined one carbonaceous particle together with a binder. The selection of such 100 graphite composite particles is performed at random. Also, the measured area S is an area of a portion surrounded by the particle contour when the graphite composite particle is observed from right above in a SEM observation.

(iii) Range

In the present invention, an upper limit of $D_L/D_S$ is inevitably 2 or less, preferably 1.5 or less, particularly preferably 1.4 or less, further preferably 1.3 or less. If the $D_L/D_S$ is more than this upper limit, when used as a negative electrode active material, a streak line is readily generated at a coating of the active material layer and a yield at a preparation of a negative electrode may decrease.

A lower limit of $D_L/D_S$ is inevitably more than 1, preferably 1.15 or more, particularly preferably 1.2 or more. If the $D_L/D_S$ is less than this lower limit, a charge-discharge irreversible capacity in an initial cycle may become large.

Here, $D_L/D_S$ is a ratio of particle sizes obtained by two different methods and is a numerical value related to a particle shape. This numerical value must satisfy $1<D_L/D_S\leq2$, in other words, a graphite particle originated in a carbonaceous particle which is a particle working out to a nucleus is connected at a specific ratio in the final graphitized composite particle. That is, when two or more graphite particles originated in a carbonaceous particle are connected and calcined together with a binder to form a graphite composite particle, $D_L$ is generally larger than $D_L$ comprising a graphite composite particle each containing one graphite particle. On the other hand, in the case of $D_S$, as described above, a graphite composite particle in which two or more graphite particles are connected is not included in 100 particles selected for measurement. Accordingly, a connecting ratio can be specified by the numerical value range of $D_L/D_S$.

$D_L$ is not limited as long as the $D_L/D_S$ is in the above-described range, but this is usually 5 μm or more, preferably 10 μm or more, more preferably 13 μm or more, and is usually 40 μm or less, preferably 30 μm or less, more preferably 25 μm or less. If the $D_L$ is excessively large, when used as a negative electrode active material, a streak line is readily generated at a coating of the active material layer and a yield at a preparation of a negative electrode may decrease, whereas if the $D_L$ is too small, a charge-discharge irreversible capacity in an initial cycle may become large.

$D_S$ is not limited as long as the $D_L/D_S$ is in the above-described range, but this is usually 5 μm or more, preferably 10 μm or more, more preferably 13 μm or more, and is usually 40 μm or less, preferably 30 μm or less, more preferably 20 μm or less. If the $D_S$ is excessively large, when used as a negative electrode active material, a streak line is readily generated at a coating of the active material layer and a yield at a preparation of a negative electrode may decrease, whereas if the $D_S$ is too small, a charge-discharge irreversible capacity in an initial cycle may become large.

(b) Requirement (2)

(i) Definition of Raman R Value

In a Raman spectrum obtained by a Raman measurement described later, an intensity ratio $I_B/I_A$ between an intensity $I_A$ of a maximum peak of 1,580 cm$^{-1}$ around and an intensity $I_B$ of a maximum peak of 1,360 cm$^{-1}$ around is defined as a Raman R value.

In a Raman measurement, a Raman spectrometer (for example, a Raman spectrometer manufactured by JASCO Corp.) is used and after filling a sample in a measurement cell by freely falling a particle to be measured, the measurement is performed while irradiating argon ion laser light in the measurement cell and rotating the measurement cell in a plane perpendicular to the laser light. Measurement conditions are as follows.

Wavelength of argon ion laser light: 514.5 nm
Laser power on sample: from 15 to 25 mW
Resolution: 4 cm$^{-1}$
Measured range: from 1,100 cm$^{-1}$ to 1,730 cm$^{-1}$
Measurement of peak intensity, measurement of peak half-value width: Background processing, smoothing processing (simple average: 5 points in convolution)

The maximum peak of 1,580 cm$^{-1}$ around is a peak derived from a graphite crystalline structure, and the maximum peak of 1,360 cm$^{-1}$ around is a peak derived from a carbon atom reduced in a symmetry property due to a structural defect.

(ii) Range

In the present invention, the Raman R value is inevitably 0.14 or less, preferably 0.13 or less, particularly preferably 0.12 or less. If the Raman R value is more than this upper limit, a charge-discharge irreversible capacity in an initial cycle may become large. Also, the Raman R value is inevitably 0.04 or more. In view of a performance, the Raman R value is preferably lower, but if a graphite composite particle having a Raman R value of less than 0.04 is intended to obtain, a yield may decrease and a productivity may become extremely bad.

In the graphite composite particle of the present invention, a Raman half-value width of the maximum peak of 1,580 cm$^{-1}$ around is not particularly limited but is usually 18 cm$^{-1}$ or more, preferably 19 cm$^{-1}$ or more, and is usually 23 cm$^{-1}$ or less, preferably 21 cm$^{-1}$ or less. If the Raman half-value width is less than this range, a crystallinity on a particle surface becomes excessively high and when increased in a density, a crystal is readily oriented in a direction parallel to a current collector plane and this may incur a reduction in a load characteristics. On the other hand, if the Raman half-value width is more than this range, a crystal on a particle surface is disturbed to increase a reactivity with an electrolytic solution, and a reduction in an efficiency or a increase of a gas generation may be incurred.

The graphite composite particle of the present invention must satisfy the requirement (1) that $D_L/D_S$ is more than 1 and 2 or less, and the requirement (2) that a Raman R value is 0.04 or more and 0.14 or less. When a pulverization after calcining is excessively performed so as to decrease a ratio of a graphite composite particle where two or more graphite particles are connected, the $D_L/D_S$ can be easily made to be 2 or less, but if the Raman R value thereby is 0.14 or more, a charge-discharge irreversible capacity may be increased, and in this case, it may be difficult to obtain the effect of the present invention.

A production method of the graphite composite particle satisfying the requirement (1) that $D_L/D_S$ is more than 1 and 2 or less, and the requirement (2) that a Raman R value is 0.04 or more and 0.14 or less, is not particularly limited as long as the requirements (1) and (2) are eventually satisfied. The production method of the graphite composite particle of the present invention satisfying the requirements (1) and (2) is described in detail later in a paragraph of Production Method, but a graphite composite particle where graphite particles are appropriately connected at a specific number ratio can be obtained and the requirements (1) and (2) can be satisfied, for example, by an ingenuity of a carbonaceous particle as a raw material; and an ingenuity of a mixing (kneading) of a carbonaceous particle with a binder. Examples of the method for producing a graphite composite particle showing the above-described powder properties include a method of kneading a specific spheronized natural graphite with a binder (pitch), forming, calcining, and subjecting to a graphitization.

(c) Average Degree of Circularity (i) Definition of Average Degree of Circularity An average degree of circularity is defined as a value obtained according to the following formula, which is determined by mixing 0.2 g of a measuring object (graphite composite particle) with 50 mL of a 0.2 vol % polyoxyethylene (20) sorbitan monolaurate aqueous solution as a surfactant, irradiating an ultrasonic wave of 28 kHz thereon at a power of 60 W for 1 minute by using a flow-type particle image analyzer (for example, "FPIA-2000" manufactured by Sysmex Industrial), specifying a detection range of 0.6 to 400 μm, and measuring a particle having a particle size of 10 to 40 μm.

Average degree of circularity=circumferential length of a circle having the same area as the particle projected area/circumferential length of the particle projected image (ii) Range In the present invention, an average degree of circularity is not particularly limited but is preferably 0.8 or more, particularly preferably 0.85 or more, further preferably 0.9 or more, and is preferably 0.98 or less, particularly preferably 0.95 or less. If the average degree of circularity is less than this range, a gap between particles may become small to decrease a load characteristic. On the other hand, if an average degree of circularity more than this range is intended to obtain, a spheronized treatment of repeatedly applying a mechanical action, mainly an impact force, including an interaction of particles, such as a compression, a friction and a shear force, needs to be performed strongly or for a long time, and a large amount of by-product fine powder produced at the spheronization must be removed and a production cost may rise.

(d) Tap Density (i) Definition of Tap Density

In the present invention, a tap density is defined as a value measured by using a powder density measuring apparatus ("Tap Denser KYT-4000" manufactured by Seishin Enterprise Co., Ltd.); filling up with graphite composite particles in a cylindrical tap cell having a diameter of 1.6 cm and a volume capacity of 20 cm$^3$ by dropping the particles therein through a sieve having a sieve opening of 300 μm; and tapping 1,000 times with a stroke length of 10 mm.

(ii) Range

A tap density of the graphite composite particle of the present invention is not particularly limited but is preferably 0.7 g/cm$^3$ or more, particularly preferably 0.75 g/cm$^3$ or more, further preferably 0.8 g/cm$^3$ or more, further particularly preferably 0.9 g/cm$^3$ or more, and is preferably 1.5 g/cm$^3$ or less, particularly preferably 1.3 g/cm$^3$ or less. If the tap density is too low, a slurry concentration of a negative electrode active material coated on a current collector at a production of the negative electrode needs to be decreased and a density of the coating layer becomes low, as a result, the graphite composite particle when pressed is readily broken and a battery performance may decrease. On the other hand, if the tap density is too high, a coatability is worsened and a further step of adjusting a shape and particle size distribution of the graphite composite particle may be required, giving rise to a decrease in a yield and a rise of a cost.

(e) Specific Surface Area

A specific surface area of the graphite composite particle of the present invention as measured by a BET method is not particularly limited but is usually 0.2 m$^2$/g or more, preferably 0.3 m$^2$/g or more, and is usually 8 m$^2$/g or less, preferably 6 m$^2$/g or less, particularly preferably 4 m$^2$/g or less. If the specific surface area is less than this range, an output characteristic may decrease, whereas if the specific surface area is more than this range, an initial irreversible capacity may increase and worsen a cycle characteristics.

In the present invention, the specific surface area is defined according to the following method. That is, a measurement is performed by a BET one-point method using a surface area measuring apparatus, "AMS8000", manufactured by Ohkura Riken Co., Ltd. according to a nitrogen gas adsorption flow process. Specifically, a specific surface area is determined by filling 0.4 g of a sample (graphite composite particle) in a cell; subjecting to a sample pretreatment under heating at 350° C.; cooling the sample to a liquid nitrogen temperature to cause a saturated adsorption of a gas of 30% of nitrogen and 70% of He; heating the sample to a room temperature; measuring an amount of the desorbed gas; and calculating from the obtained result using a normal BET method.

(f) Graphite Crystal Orientation Ratio on Electrode

In a predetermined electrode produced by the following polar plate production method A using the graphite composite particle of the present invention, a graphite crystal orientation ratio on polar plate $I_{110}/I_{004}$ measured by the following method is not particularly limited but is usually 0.08 or more, preferably 0.09 or more, particularly preferably 0.10 or more, and is usually 0.20 or less, preferably 0.18 or less, particularly preferably 0.16 or less. If the orientation ratio $I_{110}/I_{004}$ is less than this range, an electrode expansion at a charge at a production of a battery increases and this may make it difficult to increase a battery capacity per unit volume of the electrode. Furthermore, a cycle characteristic may readily decrease due to such as dropping off of an active material resulting from an expansion and shrinkage during a cycle test. On the other hand, if the orientation ratio $I_{110}/I_{004}$ is more than the range above, a packing density of the electrode after pressing may be difficult to increase.

Here, the graphite crystal orientation ratio on an electrode $I_{110}/I_{004}$ is an indicator showing a degree of orientation of graphite crystal hexagonal graphene surface with respect to a thickness direction of the electrode. As the orientation ratio $I_{110}/I_{004}$ is larger, this indicates a state that particles are more misaligned in a direction of a graphite crystal hexagonal graphene surface.

[Production Method A of Electrode]

Two Parts by weight as a solid content of an aqueous dispersion of styrene butadiene rubber and 1 part by weight as a solid content of an aqueous carboxymethyl cellulose (weight average molecular weight: 250,000 to 300,000) solution are added to 100 parts by weight of the graphite composite particle to form a slurry, and this slurry is coated by a doctor blade on a current collector comprising a 18 μm-thick copper foil to adhere in an amount of 10±0.1 mg/cm$^2$ in terms of a dry weight, and after drying, a consolidation is performed by pressing once while adjusting a press load to form an active material layer having a density of 1.73±0.03 g/cm$^3$.

[Measuring Method of Graphite Crystal Orientation Ratio on Polar Plate]

With respect to the electrode prepared by the production method A of electrode above, charts of (110) plane and (004) plane of graphite on the electrode are measured by a X-ray diffraction, and a peak separation of the measured charts are performed by fitting with asymmetric Peason VII as a profile function, and integrated intensities of the peak of (110) plane and (004) plane are calculated. From the obtained integrated intensities, a ratio represented by [(110) plane integrated intensity/(004) plane integrated intensity] is calculated and defined as a graphite crystal orientation ratio on polar plate.

Conditions of a X-ray diffraction measurement are as follows. Here, "2θ" indicates a diffraction angle.

Target: Cu (Kα ray) graphite monochrometer

Slit: divergence slit=1, receiving slit=0.1 mm, scattering slit=1°

Measurement range and step angle/measurement time:
  (110) plane: 76.50≦2θ≦78.5°, 0.01°/3 seconds
  (004) plane: 53.50≦2θ≦56.0°, 0.01°/3 seconds Sample preparation:

A predetermined electrode is fixed to a glass plate with a 0.1 mm-thick double-sided tape.

(g) Press Load

A press load required at producing the polar plate by Production Method A of Electrode such that an active material layer has a density of 1.73±0.03 g/cm$^3$ is not particularly limited in its range, but the press load required of the graphite composite particle is, in terms of a load per length of 5 cm, preferably 200 kgf/5 cm or more, particularly preferably 250 kgf/5 cm or more, further preferably 300 kgf/5 cm or more, and is usually 1,200 kgf/5 cm or less, preferably 1,000 kgf/5 cm or less, particularly preferably 850 kgf/5 cm or less. That is, the graphite composite particle of the present invention is preferably a graphite composite particle enabling to produce a polar plate in which a density of the active material layer is 1.73±0.03 g/cm$^3$ by adjusting the press load to fall in the range above.

If a graphite composite particle has a press load less than this lower limit, the graphite composite particle is readily collapsed, a density of the active material layer of the electrode is difficult to control, and a bad soaking and a low soaking rate may result at producing a battery. Furthermore, the negative electrode material may be collapsed to clog a path of lithium ion, and a rate characteristic may decrease. On the other hand, if a graphite composite particle has a press load more than this upper limit, a dropping of the active material layer from the electrode tends to increase.

A production method of the graphite composite particle having the press load in the above range is not particularly limited, but such a graphite composite particle can be obtained by an ingenuity of a carbonaceous particle species, a binder amount, a graphitization degree or the like.

The graphite composite particle for a nonaqueous secondary battery of the present invention (hereinafter sometimes simply referred to as a "graphite composite particle (A)") may be used by itself as a negative electrode active material for a nonaqueous secondary battery, but it is also preferred to further incorporate one or more carbonaceous active material particles (hereinafter simply referred to as a "carbonaceous active particle (B)") selected from the group consisting of natural graphite, artificial graphite, amorphous carbon coated graphite, resin coated graphite and amorphous carbon and use as a negative electrode active material for a nonaqueous secondary battery.

By appropriately selecting and mixing the carbonaceous active material particle (B), an electrical conductivity can be enhanced and this enables an enhancement of cycle characteristic, an enhancement of charge acceptance, a reduction of irreversible capacity and an enhancement of press property. In the case of mixing the carbonaceous active material particle (B), a lower limit of amount thereof is 0.1 mass % or more, preferably 0.5 mass % or more, more preferably 0.6 mass % or more, and an upper limit thereof is 80 mass % or less, preferably 50 mass % or less, more preferably 40 mass % or less, based on the entire negative electrode active material. If the amount is less than this range, an effect of enhancing an electrical conductivity may be difficult to obtain, whereas if it is more than this range, a increase in an initial irreversible capacity may be incurred.

Among the carbonaceous active material particles (B), as for natural graphite, for example, flake graphite increased in a purity or spheronized graphite may be used. A volume-based average particle size of the natural graphite is usually 8 μm or more, preferably 12 μm or more, and is usually 60 μm or less, preferably 40 μm or less. A BET specific surface area of the natural graphite is usually 4 $m^2$/g or more, preferably 4.5 $m^2$/g or more, and is usually 7 $m^2$/g or less, preferably 5.5 $m^2$/g or less.

As for the artificial graphite, for example, a particle obtained by compounding a coke powder or natural graphite with a binder, a particle obtained by calcining and graphitizing a single graphite precursor particle in a powdery state, or the like, may be used.

As for the amorphous coated graphite, for example, a particle obtained by coating natural graphite or artificial graphite with an amorphous carbon precursor and calcining, or a particle obtained by coating natural graphite or artificial graphite with an amorphous carbon material using a CVD, may be used.

As for the resin coated graphite, for example, a particle obtained by coating natural graphite or artificial graphite with a polymer material and drying, or the like, may be used. As for the amorphous carbon, for example, a particle obtained by calcining a bulk mesophase, or a particle obtained by subjecting a carbon precursor to a non-melting treatment and calcining may be used.

Among these, in the case of using by blending such a particle as the carbonaceous active material particle (B) to the graphite composite particle of the present invention, natural graphite is particularly preferred because a high capacity can be maintained.

In the case of producing a negative electrode active material by mixing the carbonaceous active material particle (B) with the graphite composite particle (A), a mixing ratio of the carbonaceous active material particle (B) is preferably 5 mass % or more, particularly preferably 15 mass % or more, and is usually 95 mass % or less, preferably 80 mass % or less, based on the entire negative electrode active material. If the mixing ratio of the carbonaceous active material particle (B) is less than the above-described range, the above effect by the addition of the carbonaceous active material particle (B) may be hardly obtained, whereas if it is more than the above-described range, a characteristic of the graphite composite particle (A) may be hardly obtained.

A press load of the negative electrode active material of the present invention, which is measured in the same manner as in the paragraph of Physical Properties of Graphite Composite Particle, is in terms of a load per 5 cm, preferably 200 kgf/5 cm or more, particularly preferably 250 kgf/5 cm or more, further preferably 300 kgf/5 cm or more, and is usually 1,200 kgf/5 cm or less, preferably 1,000 kgf/5 cm or less, particularly preferably 850 kgf/5 cm or less.

More specifically, the active material layer is formed by blending 100 parts by weight of the negative electrode active material, 2 parts by weight as a solid content of a water dispersion of styrene butadiene rubber, and 1 part by weight as a solid content of an aqueous solution of carboxymethyl cellulose having a weight average molecular weight of 250,000 to 300,000 to form an aqueous slurry; coating the aqueous slurry on a 18 μm-thick copper foil by using a doctor blade to have a dry film thickness of 10±0.1 mg/$cm^2$; drying; and forming an active material layer having a width of 5 cm by using a roll press having a roller of 20 cm in diameter while adjusting a press load between two metal-made rollers so as to have a density of 1.73±0.03 g/$cm^3$ by pressing once, in which the press load is preferably in the above range.

If the negative electrode active material has a press load less than this lower limit, a particle is readily collapsed, a density of the active material layer of the electrode is difficult to control, and a bad soaking property and a low soaking rate may result at producing a battery. Furthermore, the particle collapsed may clog a path of lithium ion and a rate characteristic may decrease. On the other hand, if the negative electrode active material has a press load more than this upper limit, a dropping of the active material layer from the electrode tends to increase. Also, a higher-performance pressing apparatus may be required.

The negative electrode active material having a press load in the above-described range is not particularly limited in its preparation method but can be obtained by an ingenuity of a carbonaceous particle species, a binder amount, a graphitization degree, or the like, of the graphite composite particle (A); and optimizing a mixing ratio of the graphite composite particle (A) and the carbonaceous active material particle (B) according to a difference in a softness between two particles (A) and (B).

A production method is described below. The graphite composite particle of the present invention is produced by mixing a carbonaceous particle as a raw material, a binder and the like; forming if desired; calcining for removing a volatile component; subjecting to a graphitization; pulverizing; and classifying. In order to produce the graphite composite particle of the present invention satisfying the above-described physical properties, it is important to combine the following ingenuity points.

Examples of the ingenuity point for a raw material include selecting a spheronized graphite having a high average degree of circularity as a main component of the carbonaceous particle.

Also, a graphite composite particle where graphite particles are appropriately and partially connected can be obtained by an ingenuity such as an optimization of a kind or amount of a pitch as a binder at kneading a carbonaceous particle and a binder, and an ingenuity such that a strength at pulverizing is optimized or an excessive impact is not applying during a pulverization.

A preferable production method of the graphite composite particle or the like of the present invention is described in detail below.

First, a carbonaceous particle and a binder are kneaded while heating. At this time, if desired, a graphitization catalyst may be added. The preferable carbonaceous particle, the binder and the graphitization catalyst are as follows.

[Carbonaceous Particle]

A main component of the carbonaceous particle which is a primary particle as a raw material preferably has a high degree of sphericity from a standpoint of obtaining a graphite composite particle having a high tap density so as to improve a coatability, and spheronized natural graphite is particularly preferred. Examples thereof usually include one whose raw material is natural graphite having such high crystallinity that a plane spacing ($d_{002}$) of (002) plane is 0.340 nm or less according to a X-ray wide-angle diffraction method. Specifically, natural graphite, one obtained by adding a mechanical pulverized product to natural graphite so as to increase a degree of circularity, and/or heat-treating these at 1,000° C. or more, are preferred.

A median size of the volume-based particle size distribution by a laser diffraction/scattering-type particle size distribution measurement of the carbonaceous particle is not particularly limited but is preferably 5 μm or more, more preferably 6 μm or more, particularly preferably 8 μm or more, and is preferably 40 μm or less, more preferably 35 μm or less, particularly preferably 30 μm or less. If the median size of the carbonaceous particle is less than this lower limit, a cost is liable to rise, whereas if the median size of the carbonaceous particle is more than the upper limit, this readily gives rise to generation of a failure at coating. The median size of the carbonaceous particle can be measured in the same manner as the median size of the above-described negative electrode material.

As for an average particle size of the carbonaceous particle, a carbonaceous particle having an average particle size smaller than the average particle size of the objective graphite composite particle is preferably used, and a carbonaceous particle having an average particle size equal to or smaller than the average particle size of the objective graphite composite particle is usually used. A lower limit is ⅔ or more, preferably ¾ or more of the average particle size of the objective graphite composite particle.

The carbonaceous particle as a raw material of the graphite composite particle of the present invention is particularly preferably a carbonaceous particle passed through a spheronized treatment. As for an apparatus used for the spheronized treatment, for example, an apparatus of repeatedly applying a mechanical work, mainly impact force, including interaction of particles such as a compression, a friction and a shear force, to the particle may be used. Specifically, an apparatus with a rotor having many blades inside a casing, in which a mechanical work such as an impact compression, a friction, and a shear force, is applied to the carbon material introduced inside by rotating the rotor at a high speed to perform the surface treatment, is preferred. Also, an apparatus having a mechanism of repeatedly applying a mechanical work by circulating a carbon material is preferred. Preferred examples of the apparatus include Hybridization System (manufactured by Nara Machinery Co., Ltd.), Kryptron (manufactured by Earth Technica Co., Ltd.), CF Mill (manufactured by Ube Industries, Ltd.), Mechanofusion System (manufactured by Hosokawa Micron Corporation), and Theta Composer (manufactured by Tokuju Corp.). Among these, Hybridization System manufactured by Nara Machinery Co., Ltd. is preferred. In the case of treating with this apparatus, a peripheral velocity of the rotating rotor is preferably set to from 30 to 100 m/sec, more preferably from 40 to 100 m/sec, further preferably from 50 to 100 m/sec. The treatment may be performed only by merely passing a carbonaceous material but is preferably performed by causing a carbonaceous material to circulate or reside in the apparatus for 30 seconds or more, and is more preferably performed by causing a carbonaceous material to circulate or reside in the apparatus for 1 minute or more.

An average degree of circularity of the carbonaceous particle is usually 0.85 or more, preferably 0.9 or more, and is usually 1.0 or less, preferably 0.96 or less. If the average degree of circularity of the carbonaceous particle is less than this lower limit, an orientation degree readily decreases, whereas if it is more than the upper limit, a cost is liable to rise. As for the average degree of circularity of the carbonaceous particle, a value obtained in the same manner as the above-described average degree of circularity of the negative electrode material above is used.

A tap density of the carbonaceous particle is usually 0.8 $g/cm^3$ or more, preferably 0.9 $g/cm^3$ or more, more preferably 0.95 $g/cm^3$ or more, and is usually 1.35 $g/m^3$ or less, preferably 1.2 $g/cm^3$ or less. If the tap density of the carbonaceous particle is less than this range, in the case of producing an active material, a packing density can be hardly increased and a high-capacity battery may not be obtained. On the other hand, a carbonaceous particle having a tap density more than this range can be hardly obtained with a good yield and a cost may rise. A measuring method of the tap density is the same as that described in regard to the graphite composite particle for a secondary battery.

Specific examples of the binder include a coal-type heavy oil such as an impregnated pitch, a binder pitch, a coal tar pitch and a coal liquefied oil, and a petroleum-type heavy oil such as a straight heavy oil (e.g., asphaltene) and a decomposition-type heavy oil (e.g., ethylene heavy end tar).

A content of a quinoline-insoluble component in the binder is usually from 0 to 10 mass %, but a smaller content is more preferred in view of a hardness or a capacity at producing a battery. If the content of quinoline-insoluble components in the binder is excessively large, the obtained graphite composite particle comes to have a high strength, and even when an active layer coated on a current collector is pressed, the particle is not deformed, tending to make it difficult to increase a density. Also, a capacity may decrease.

The binder is used in an amount such that a ratio of the portion derived from the binder occupies usually 5 mass % or more, preferably 10 mass % or more, in the graphite composite particle obtained by a carbonization/graphitization and passed through a graphitization treatment. An upper limit is such an amount that this ratio becomes usually 60 mass % or less, preferably 40 mass % or less, more preferably 30 mass % or less. If the binder amount is excessively large, an amorphous portion derived from the binder occupies a large proportion in the final product, a battery capacity may decrease at producing a battery. Furthermore, the obtained graphite composite particle becomes hard, and when the active material layer coated on a current collector is pressed, not a binder-derived portion but a carbonaceous particle-derived graphite particle itself is readily collapsed. On the other hand, a smaller binder amount is more preferred in view of a battery characteristic, but if it is too small, forming after kneading becomes difficult and a production cost may rise.

The binder amount in the graphite composite particle is controlled by an amount of the binder added at a stage before kneading. For example, in the case where a carbon residue rate of the binder determined by the method described in JIS K2270 is p %, a binder of 100/p times of the desired amount is added.

As for the ingenuity at an addition of the binder such as a pitch and a tar, it is preferred for decreasing an initial irreversible capacity and a press load to uniformly disperse the binder at a low temperature in a short time as much as possible. The carbonaceous particle may be strongly stirred in the extent that the carbonaceous particle is not disintegrated, for performing the dispersion at a low temperature for a short time.

[Graphitization Catalyst]

In order to increase a charge-discharge capacity and decrease a press load, a graphitization catalyst may be added at mixing of the carbonaceous particle and the binder. Examples of the graphitization catalyst include a metal such as iron, nickel, titanium, silicon and boron, and a compound such as a carbide, an oxide and a nitride of the metal. Among these, silicon, a silicon compound, iron and an iron compound are preferred. A silicon carbide is preferred among silicon compounds, and an iron oxide is preferred among iron compounds.

In the case where silicon or a silicon compound is used as the graphitization catalyst, a silicon carbide produced by heating is all thermally decomposed at a temperature of 2,800° C. or more, and this allows a growth of graphite with a very good crystallinity and a formation of a pore among graphite crystals at volatilizing of silicon, so that a charge transfer reaction and diffusion of lithium ion inside the particle can be promoted and a battery performance can be enhanced. In the case where iron or a compound thereof is used as the graphitization catalyst, graphite with a good crystallinity can be grown by mechanisms of dissolution and precipitation of carbon in the catalyst and the same effect as that of silicon can be brought out.

An additive amount of the graphitization catalyst is usually 30 mass % or less, preferably 20 mass % or less, more preferably 10 mass % or less, particularly preferably 5 mass % or less, based on the carbonaceous primary particle as a raw material. If the amount of the graphitization catalyst is too large, a graphitization excessively proceeds and there may arise a problem such as an insufficiency of a property, particularly, an electrolyte soaking property, at the production of a lithium ion secondary battery. At the same time, a pore produced in the graphite composite particle would decrease a strength of the particle, as a result, a surface is smoothed in a pressing step at the production of an electrode and a movement of ion may be inhibited.

On the other hand, if the amount of the graphitization catalyst is too small, a graphitization proceeds insufficiently to cause a problem of a reduction in a charge-discharge capacity of a nonaqueous secondary battery produced, or a high loading pressure is required in a pressing step at the production of an electrode, making it difficult to increase a density. Furthermore, since an appropriate number of pores would not be present in the graphite composite particle, the particle comes to have too high strength and a high loading pressure is required when the active layer coated on a current collector is press-formed to a predetermined bulk density, as a result, the negative electrode active material layer may be difficult to increase in a density.

[Kneading (Mixing)]

The raw materials such as a carbonaceous particle, a binder and, a graphitization catalyst added if desired, are first kneaded under heating to create a state of the binder in liquid form being impregnated to the carbonaceous particle and the raw material which is not melted at a kneading temperature. In this case, all raw materials may be charged into a kneader and a kneading may be performed simultaneously with rising temperature. Alternatively, a component other than the binder may be charged into a kneader and heated with stirring and after rising a temperature to a kneading temperature, the binder may be added at an ordinary temperature or in a vulcanized and melted state.

A heating temperature is more than a softening point of the binder. If the heating temperature is too low, a viscosity of the binder increases and a mixing becomes difficult. Therefore, the heating is performed usually at a temperature of 10° C. or more than the softening point, preferably at a temperature of 20° C. or more than the softening point. If the heating temperature is too high, a viscosity of a mixing system is excessively increased due to a volatilization and a polycondensation of the binder, and therefore, the heating temperature is usually 300° C. or less, preferably 250° C. or less.

A kneader is preferably a machine having a stirring blade, and a general-purpose stirring blade such as Z type and masticator type may be used. An amount of a raw material charged into the kneader is usually 10 vol % or more, preferably 15 vol % or more, and is 50 vol % or less, preferably 30 vol % or less, based on an internal volume of the mixer. A kneading time is required to be 5 minutes or more and not longer than a time for which a viscous property greatly changes due to a volatilization of a volatile content, and is usually from 30 to 120 minutes. The kneader is preferably preheated to a kneading temperature in advance of kneading.

[Forming]

The resulting kneaded material may be directly subjected to a de-VM calcining step for a purpose of removing and carbonizing a volatile component (hereinafter simply referred to as "VM") but is preferably subjected to the de-VM calcining step after forming so as to facilitate a handling.

A forming method is not particularly limited as long as a shape can be maintained, and an extrusion molding, a die molding, an isostatic molding, and the like, may be employed. Among these, a die molding requiring a relatively easy operation and enabling to obtain a formed product without collapsing a randomly oriented structure resulting from kneading is more preferred than an extrusion molding which allows a particle to be readily oriented in a formed product, or an isostatic molding having a problem in a productivity though a random orientation of a particle is maintained.

As for a forming temperature, the forming may be performed either at room temperature (cold) or under heating (hot, temperature more than a softening point of a binder). In the case of a cold forming, in order to enhance a formability and obtain an uniformity of a formed product, a mixture cooled after kneading is preferably coarsely pulverized to a maximum dimension of 1 mm or less. A shape and size of the formed product are not particularly limited, but in a hot forming, if the formed product is too large, there is a problem that much time is spent for performing uniform preheating in advance of forming, and therefore, the size is preferably about 150 cm or less in terms of a maximum dimension.

As for a forming pressure, if the pressure is too high, a removal of a volatile component (de-VM) through a pore of the formed product can be hardly performed and a carbonaceous particle not in a perfect circle may be oriented to make the pulverizing in an after-step difficult. From these reasons, an upper limit of the forming pressure is usually 3 tf/cm$^2$ (294 MPa) or less, preferably 500 kgf/cm$^2$ (49 MPa) or less, more preferably 10 kgf/cm$^2$ (0.98 MPa) or less. A lower limit of the pressure is not particularly limited but is preferably set to such an extent that a shape of a formed product can be maintained in a de-VM step.

[De-VM Calcining]

With regard to the resulting formed product, the volatile components (VM) are removed from the carbonaceous particle and binder, and a de-VM calcining is performed in order to prevent a contamination by a packing material at a graphitization or a fixation of a packing material to the formed product. The de-VM calcining is performed at a temperature of usually 600° C. or more, preferably 650° C. or more, and is usually 1,300° C. or less, preferably 1,100° C. or less, usually for 0.1 to 10 hours. A heating is usually performed under a flow of an inert gas such as nitrogen and argon or in a non-oxygenated atmosphere created by filling a gap with a granular carbon material such as a breeze and a packing coke.

An equipment used for the de-VM calcinig is not particularly limited as long as the calcinig can be performed in a non-oxygenated atmosphere, and may be, for example, an electric furnace, a gas furnace or a lead hammer furnace for an electrode material. A rising temperature rate at heating is preferably low for removing a volatile content, and the temperature is usually risen at 3 to 100° C./hr from the vicinity of 200° C. at which a low boiling point content is started to volatilize, to the vicinity of 700° C. at which only hydrogen is generated.

A carbide formed product obtained by the de-VM calcining is subsequently graphitized by heating at a high temperature. A hating temperature at the graphitization is usually 2,600° C. or more, preferably 2,800° C. or more. If the heating temperature is too high, graphite is prominently sublimated, and therefore, the heating temperature is preferably 3,300° C. or less. The heating is only necessary to be performed until a binder and a carbonaceous particle become graphite, and a heating time is usually from 1 to 24 hours.

In order to prevent oxidization, the graphitization is performed under a flow of an inert gas such as nitrogen and argon or in a non-oxygenated atmosphere created by filling a gap with a granular carbon material such as a breeze and a packing coke. An equipment used for a graphitization is not particularly limited as long as the above-described purpose can be attained, and may be, for example, an electric furnace, a gas furnace or an Acheson furnace for an electrode material. A rising temperature rate, a cooling rate, a heat-treatment time, and the like, can be arbitrarily set within an allowable range of the used equipment.

[Pulverizing]

The thus-obtained graphitization treated material by itself is not usually satisfying the requirement (1) of the present invention. Therefore, a pulverizing and/or a removal of a large-size granular material and a small-size granular material are performed.

A pulverizing method of the graphitization treated material is not particularly limited, but examples of the pulverizing means include mechanically milling means such as a ball mill, a hammer mill, a CF mill, an atomizer mill and a pulverizer, and pulverizing means utilizing a wind force, such as a jet mill. As for a coarse pulverizing and a medium pulverizing, a pulverizing system by an impact force, such as a jaw crusher, a hammer mill and a roller mill, may be used. A timing of pulverizing may be either before a graphitization or after a graphitization. The latter is preferred because an operation such as crucible-filling is not necessary and the graphite composite particle can be produced at a low cost.

If the pulverizing is excessive, $D_L/D_S$ may be 1 or less, and if the pulverizing is insufficient, $D_L/D_S$ may be more than 2.

[Classification]

A removal of a large-size granular material and a small-size granular material (fine powder) from the resulting pulverized material may be performed, if desired. The $D_L/D_S$ is decreased by removing a large-size granular material, and the $D_L/D_S$ is increased by removing a small-size granular material.

A removal of a large-size granular material may bring in a generation of a short-circuit or in a reduction of unevenness at coating. A removal of a small-size granular material (fine powder) may bring in a reduction of an initial irreversible capacity. Also, a particle size is preferably regulated by a removal of a large-size granular material or a fine powder such that in a volume-based particle size distribution obtained by a laser diffraction/scattering particle size distribution measurement, those having a particle size of 100 μm or more account for 3% or less of the total and those having a particle size of 1 μm or less account for 1% or less of the total.

For removing a large-size particulate material and a small-size particulate material, there are various methods but a removal by sieving or performing a classification is preferred in view of a simplicity or operability of an equipment and a cost. Furthermore, the sieving or the classification is advantageous in that a particle size distribution and average particle size of the graphite composite particle, which are changed by resulting from a graphitization and a removal of the granular material, can be readjusted, if desired.

The sieving for a removal of a large-size granular material includes a mesh fixing system, an in-plane motion system, a rotary sieving system, but in view of a treatment ability, a blow through-type sieve among mesh fixing systems is preferred. As for an opening size of the sieve used, a sieve having an opening size of 80 μm or less and 30 μm or more may be used, and an appropriate sieve is selected according to a production condition (particularly, amount and particle size) of the granular material to be removed and a required adjustment of a particle size distribution and an average particle size of the graphite composite particle. If the size is more than 80 μm, the granular material may be insufficiently removed, whereas if the size is less than 30 μm, this may lead to an excessive removal of the graphite composite particle, and not only a large amount of a production loss may result but also an adjustment of the particle size distribution may become difficult. Incidentally, as a general-purpose size, a commercially available sieve having an opening size of 45 μm or 38 μm may be preferably used.

The classification may be performed by a method such as an air classification, a wet classification and a gravity classification and is not particularly limited for removing a granular material of 100 μm or more, but in view of an effect on the property of the graphite composite particle as well as an adjustment of a particle size distribution and an average particle size of the graphite composite particle, a use of an air classifier such as a rotational flow classifier is preferred. In this case, a removal of the particulate material and an adjustment of a particle size distribution and average particle size of the graphite composite particle can be performed by controlling an air volume and a wind velocity, similarly to the case by the adjustment of the opening size of the sieve.

[Negative Electrode for Nonaqueous Secondary Battery]

The graphite composite particle of the present invention can be suitably used as a negative electrode active material of a nonaqueous secondary battery, particularly, a lithium ion secondary battery. Also, as described above, the blend of the graphite composite particle (A) of the present invention and the carbonaceous active material particle (B) can be suitably used as the negative electrode active material.

An apparatus used for mixing the graphite composite particle (A) and the carbonaceous active material particle (B) is not particularly limited, but examples of a rotary mixer include a cylindrical mixer, a twin cylindrical mixer, a double conical mixer, a regular cubic mixer and a plow-type mixer, and examples of a fixed mixer include a helical mixer, a ribbon-type mixer, a Muller-type mixer, a Helical Flight-type mixer, a Pugmill-type mixer and a fluidized-type mixer.

The negative electrode constituting a nonaqueous secondary battery is produced by forming an active material layer comprising a negative electrode active material, a polar plate-forming binder, a thickener and a conductive material on a current collector. The active material layer is usually obtained by preparing a slurry comprising a negative electrode active material, an electrode-forming binder, a thickener, a conductive material and a solvent; coating on a current collector; drying; and pressing.

The electrode-forming binder may be an arbitrary binder as long as it is a material stable to a solvent or electrolytic solution used at a production of an electrode. Examples thereof include polyvinylidene fluoride, polytetrafluoroethylene, polyethylene, polypropylene, styrene butadiene rubber, isoprene rubber, butadiene rubber, an ethylene-acrylic acid copolymer and an ethylene-methacrylic acid copolymer. The electrode-forming binder is used at a weight ratio of negative electrode active material/electrode-forming binder of usually 90/10 or more, preferably 95/5 or more, and usually 99.9/0.1 or less, preferably 99.5/0.5 or less.

Examples of the thickener include carboxymethyl cellulose, methyl cellulose, hydroxymethyl cellulose, ethyl cellulose, polyvinyl alcohol, starch oxide, starch phosphate and casein.

Examples of the conductive material include a metal material such as copper and nickel, and a carbon material such as graphite and carbon black.

Examples of a material for the current collector include copper, nickel and stainless. Among these, a copper foil is preferred in view of its easy formation into a thin film as well as a cost.

A density of the active material layer varies depending on the usage, but in the case of giving weight to a capacity, the density is usually 1.55 g/cm$^3$ or more, preferably 1.60 g/cm$^3$ or more, more preferably 1.65 g/cm$^3$ or more, particularly preferably 1.70 g/cm$^3$ or more. If the density is too low, the capacity of a battery per unit volume may not necessarily be sufficient. Also, if the density is too high, a rate characteristic decreases, and therefore, the density is preferably 1.9 g/cm$^3$ or less. The "active material layer" as used herein indicates a mixture layer comprising an active material, an electrode-forming binder, a thickener, a conductive material, and the like, on a current collector, and the density thereof indicates a bulk density of the active material layer at a time of assembling it into a battery.

[Nonaqueous Secondary Battery]

The negative electrode for a nonaqueous secondary battery, produced by using the graphite composite particle of the present invention or the negative electrode active material of the present invention, is very useful particularly as a negative electrode of a nonaqueous secondary battery such as a lithium secondary battery.

A selection of members necessary in view of a battery construction, such as a positive electrode and electrolytic solution constituting the nonaqueous secondary battery, is not particularly limited. In the following, examples of materials and the like for a member constituting the nonaqueous secondary battery are described, but the material which can be used is not limited to these specific examples.

The nonaqueous secondary battery of the present invention usually comprises at least the above negative electrode of the present invention, a positive electrode and an electrolyte.

The positive electrode is produced by forming an active material layer comprising a positive electrode active material, a conductive material and an electrode-forming binder on a positive electrode current collector. The active material layer is usually obtained by preparing a slurry comprising a positive electrode active material, a conductive material and an electrode-forming binder; coating on a current collector; and drying.

As for the positive electrode active material, a material capable of occluding and releasing lithium, for example, a lithium-transition metal composite oxide material such as a lithium cobalt oxide, a lithium nickel oxide and a lithium manganese oxide; a transition metal oxide material such as a manganese dioxide; or a carbonaceous material such as a graphite fluoride, may be used. Specific examples thereof include $LiFePO_4$, $LiFeO_2$, $LiCoO_2$, $LiNiO_2$, $LiMn_2O_4$, their non-stoichiometric compounds, $MnO_2$, $TiS_2$, $FeS_2$, $Nb_3S_4$, $MO_3S_4$, $COS_2$, $V_2O_5$, $P_2O_5$, $CrO_3$, $V_3O_3$, $TeO_2$ and $GeO_2$.

As for the positive electrode current collector, a metal which forms a passivation film on the surface through an anodic oxidation in an electrolytic solution, or an alloy thereof is preferably used, and examples thereof include a metal belonging to Groups IIIa, IVa and Va (Groups 3B, 4B and 5B), and alloys thereof. Specific examples thereof include Al, Ti, Zr, Hf, Nb, Ta and an alloy comprising such a metal. Among these, Al, Ti, Ta and an alloy containing such a metal are preferred, and Al and an alloy thereof are particularly preferred, because since these are lightweight, these are assured of a high energy density.

As for the electrolyte, an electrolytic solution, a solid electrolyte, a gelled electrolyte, and the like, are exemplified. Above all, an electrolytic solution, particularly, a nonaqueous electrolytic solution, is preferred. A nonaqueous electrolytic solution obtained by dissolving a solute in a nonaqueous solvent may be used.

As for the solute, an alkali metal salt, a quaternary ammonium salt, and the like, can be used. Specifically, for example, one or more compounds selected from the group consisting of $LiClO_4$, $LiPF_6$, $LiBF_4$, $LiCF_3SO_3$, $LiN(CF_3SO_2)_2$, $LiN(CF_3CF_2SO_2)_2$, $LiN(CF_3SO_2)(C_4F_9SO_2)$ and $LiC(CF_3SO_2)_3$ are preferably used.

As for the nonaqueous solvent, examples thereof include a cyclic carbonate such as an ethylene carbonate and a butylene carbonate; a cyclic ester compound such as a γ-butyrolactone; a chain ether such as 1,2-dimethoxyethane; a cyclic ether such as a crown ether, 2-methyl tetrahydrofuran, 1,2-dimethyl tetrahydrofuran, 1,3-dioxolane and tetrahydrofuran; and a chain carbonate such as a diethyl carbonate, an ethyl methyl carbonate and a dimethyl carbonate. For each of the solute and the solvent, one kind may be selected and used, or two or more kinds may be mixed and used. Among these, a nonaqueous solvent comprising a cyclic carbonate and a chain carbonate is preferred. Also, a compound such as a vinylene carbonate, a vinylethylene carbonate, a succinic anhydride, a maleic anhydride, propanesultone and diethylsulfone may be added thereto.

A content of the solute in the electrolytic solution is preferably 0.2 mol/L or more, particularly preferably 0.5 mol/L or more, and is preferably 2 mol/L or less, particularly preferably 1.5 mol/L or less.

Above all, a nonaqueous secondary battery produced by combining the negative electrode of the present invention with a metal chalcogenide-based positive electrode and an organic electrolytic solution mainly comprising a carbonate-based solvent realizes a large capacity, a small irreversible capacity recognized in an initial cycle, a high quick charge-discharge capacity (good rate characteristics), an excellent cycle characteristics, a high storability and reliability of battery when left standing under a high temperature, a high-efficiency discharge characteristic, and an excellent discharge characteristic at a low temperature.

For preventing a positive electrode from coming into physical contact with a negative electrode, a separator is usually provided between the positive electrode and the negative electrode. The separator preferably has a high ion permeability and a low electric resistance. A material and shape of the separator are not particularly limited, but those stable against an electrolytic solution and assured of an excellent liquid storability are preferred. Specific examples thereof include a porous sheet and a nonwoven fabric, which are produced, as a raw material, from polyolefin such as polyethylene and polypropylene.

A shape of the nonaqueous secondary battery of the present invention is not particularly limited, and examples thereof include a cylinder type obtained by spirally forming a sheet electrode and a separator, a cylinder type of inside-out structure obtained by combining a pellet electrode and a separator, and a coin type obtained by laminating a pellet electrode and a separator.

EXAMPLES

The specific embodiments of the present invention are described in greater detail below by referring to Examples, but the present invention is not limited to these Examples.

Example 1

Graphite having an average particle size of 61 μm was subjected to a spheronized treatment by using Hybridization System Model NHS-3 manufactured by Nara Machinery Co., Ltd. at a rotor peripheral speed of 70 m/sec for 5 minutes to obtain spheronized graphite having powder properties shown in Table 1. This spheronized graphite and a binder pitch having a softening point of 88° C. as a graphitizable binder were mixed at a weight ratio of 100:30, and the mixture was charged into a kneader having a masticator-type stirring blade, which was previously heated at 128° C., and kneaded for 20 minutes.

The thoroughly kneaded mixture was filled in a mold of a mold-pressing machine previously preheated to 108° C. and left sanding for 5 minutes, and when a mixture temperature was stabilized, a plunger was pressed to apply a pressure of 2 kgf/cm$^2$ (0.20 MPa) to form. After keeping this pressure for 1 minute, the driving was stopped and when a pressure dropping was settled, the formed product was taken out.

The formed product obtained was put in a metal-made saggar as a heat-resistant container, and a graphite breeze was filled in a gap. In an electric furnace, the temperature was elevated from a room temperature to 1,000° C. over 48 hours and then kept at 1,000° C. for 3 hours, and a de-VM calcining was performed. Subsequently, the formed product was put in a graphite crucible, a graphite breeze was filled in a gap, and a graphitization was performed in an Acheson furnace under heating at 3,000° C. for 4 hours.

The resulting graphite formed product was coarsely pulverized by a jaw crusher and then pulverized in a mill in which a rotation number of pulverizing blade was set to 2,000 revolutions/min as shown in Table 1, and a coarse particle was removed through a 45-μm sieve to obtain a graphite composite particle. A $D_L$, $D_S$, Raman R value, average degree of circularity and tap density of this graphite composite particle were measured, and the results obtained are shown in Table 2.

[Production Method of Polar Plate (Negative Electrode Sheet) and Measurement of Press Load]

Using this graphite composite particle as a negative electrode active material, an electrode comprising an active material layer having a density of 1.73±0.03 g/cm$^3$ was produced by the method described above. That is, specifically, 10 g of the negative electrode active material described above, 0.1 g in terms of a solid content of a carboxymethyl cellulose aqueous solution, and 0.2 g in terms of a solid content of an aqueous dispersion of styrene butadiene rubber having a weight average molecular weight of 270,000 were stirred in a hybrid mixer manufactured by Keyence Corp. for 3 minutes to obtain a slurry. This slurry was coated in a width of 5 cm on a 18 μm-thick copper foil as a current collector by a doctor blade method so as to adhere the negative electrode active material in an amount of 10±0.1 mg/cm$^2$ and then air-dried at a room temperature. After further drying at 110° C. for 30 minutes, a roll-pressed is performed with a roller of 20 cm in diameter while adjusting the press load to form an active material layer having a density of 1.73±0.03 g/cm$^3$, and a negative electrode sheet was obtained. A press load at this roll-pressing was measured, and the results obtained are shown together in Table 2.

[Production Method of Nonaqueous Secondary Battery]

The negative electrode sheet produced by the method above was punched out into a disc of 12.5 mm in diameter and used as a negative electrode, and a lithium metal foil was punched out into a disc of 12.5 mm in diameter and used as a counter electrode. A separator (made of porous polyethylene film) impregnated with an electrolytic solution obtained by dissolving $LiPF_6$ in a mixed solvent of an ethylene carbonate and an ethyl methyl carbonate (volume ratio=1:1) to give a concentration of 1 mol/L was placed between the negative electrode and the positive electrode to produce a 2016 coin-type battery.

Using the nonaqueous secondary battery above, an initial charge-discharge irreversible capacity was measured by the following method. The results obtained are shown in Table 3.

[Measuring Method of Initial Charge-Discharge Irreversible Capacity]

The 2016 coin-type battery produced by the method above was left standing for 24 hours, then charged at a current density of 0.16 mA/cm$^2$ until a potential difference between two electrodes became 0 V, and thereafter discharged at 0.33 MA/cm$^2$ until a potential difference between two electrodes became 1.5 V. A basic charge-discharge test was performed, and the average value of the discharge capacity in the first cycle was defined as the initial charge-discharge capacity. Also, the irreversible capacity (initial charge capacity−initial discharge capacity) generated in the first cycle was defined as the initial charge-discharge irreversible capacity. The initial charge-discharge irreversible capacity was measured on three coin-type batteries, and an average value was determined.

Example 2

Graphite having an average particle size of 61 μm was subjected to a spheronized treatment by using Hybridization System Model NHS-3 manufactured by Nara Machinery Co., Ltd. at a rotor peripheral speed of 65 m/sec for 4 minutes to obtain spheronized graphite having powder properties shown in Table 1. Using this spheronized graphite and a binder pitch having a softening point of 88° C. as a graphitizable binder, a graphite composite particle was obtained in the same manner as in Example 1 except for changing the binder amount and the rotation number of pulverizing blade at pulverizing as shown in Table 1. The above-described physical properties were measured. Subsequently, an electrode (negative electrode sheet) and a nonaqueous secondary battery were produced in the same manner as in Example 1, and a press load and an initial charge-discharge irreversible capacity were measured. The results obtained are shown in Tables 2 and 3.

Example 3

Graphite having an average particle size of 61 μm was subjected to a spheronized treatment by using Hybridization System Model NHS-3 manufactured by Nara Machinery Co., Ltd. at a rotor peripheral speed of 60 m/sec for 3 minutes to obtain spheronized graphite having powder properties shown in Table 1. Using this spheronized graphite and a binder pitch having a softening point of 88° C. as a graphitizable binder, a graphite composite particle was obtained in the same manner as in Example 1 except for changing the binder amount and the rotation number of pulverizing blade at pulverizing as shown in Table 1. The above-described physical properties were measured. Subsequently, a polar plate (negative electrode sheet) and a nonaqueous secondary battery were produced in the same manner as in Example 1, and a press load and an initial charge-discharge irreversible capacity were measured. The results obtained are shown in Tables 2 and 3.

Comparative Example 1

Graphite having an average particle size of 61 μm was subjected to a spheronized treatment by using Hybridization System Model NHS-3 manufactured by Nara Machinery Co., Ltd. at a rotor peripheral speed of 65 m/sec for 5 minutes to obtain spheronized graphite having powder properties shown in Table 1. Using this spheronized graphite and a binder pitch having a softening point of 88° C. as a graphitizable binder, a graphite composite particle was obtained in the same manner as in Example 1 except for changing the binder amount and the rotation number of pulverizing blade at pulverizing as shown in Table 1. The above-described physical properties were measured. Subsequently, a polar plate (negative electrode sheet) and a nonaqueous secondary battery were produced in the same manner as in Example 1, and a press load and an initial charge-discharge irreversible capacity were measured. The results obtained are shown in Tables 2 and 3.

Comparative Example 2

A graphite composite particle was obtained in the same manner as in Example 1 except for using flake graphite having powder properties shown in Table 1 as a raw material carbonaceous particle and a binder pitch having a softening point of 88° C. as a graphitizable binder, and changing the binder amount and the rotation number of pulverizing blade at pulverizing as shown in Table 1. The above-described physical properties were measured. Subsequently, a polar plate (negative electrode sheet) and a nonaqueous secondary battery were produced in the same manner as in Example 1, and a press load and initial charge-discharge irreversible capacity were measured. The results obtained are shown in Tables 2 and 3.

Example 4

Sixty Parts of the graphite composite particle obtained by the method described in Example 1 and 40 parts of spheronized graphite obtained by subjecting graphite having an average particle size of 61 μm to a spheronized treatment by using Hybridization System Model NHS-3 manufactured by Nara Machinery Co., Ltd. at a rotor peripheral speed of 60 m/sec for 3 minutes were mixed to obtain spheronized graphite having powder properties shown in Table 1. Subsequently, a polar plate (negative electrode sheet) and a nonaqueous secondary battery were produced in the same manner as in Example 1, and a press load and an initial charge-discharge irreversible capacity were measured. The results obtained are shown in Tables 2 and 3. In Table 2, the Raman R value of the negative electrode active material of Example 4 is 0.18, but the Raman R value of the graphite composite particle is 0.12 and satisfies the range of the present invention.

TABLE 1

| No. | Raw Material Carbonaceous Particle | | | | Binder Binder Amount (parts by weight) | Preparation Method Rotation Number of Pulverizing Blade (rpm) |
|---|---|---|---|---|---|---|
| | Median Size (μm) | Tap Density (g/cm$^3$) | Average Degree of Circularity | Amount of Carbonaceous Particle (parts by weight) | | |
| Example 1 | 13.7 | 0.97 | 0.93 | 100 | 30 | 2000 |
| Example 2 | 17.1 | 1.05 | 0.94 | 100 | 30 | 2500 |
| Example 3 | 21.1 | 1.02 | 0.91 | 100 | 35 | 4000 |
| Example 4 | 13.7 | 0.97 | 0.93 | 100 | 30 | 2000 |
| Comparative Example 1 | 14.0 | 0.96 | 0.93 | 100 | 50 | 5500 |
| Comparative Example 2 | 6.5 | 0.43 | 0.81 | 100 | 34 | 4000 |

TABLE 2

| No. | $D_L$ (μm) | $D_S$ (μm) | $D_L/D_S$ | Raman R Value | Average Degree of Circularity | Tap Density (g/cm³) | Press Load (kgf/5 cm) |
|---|---|---|---|---|---|---|---|
| Example 1 | 15.8 | 12.5 | 1.26 | 0.12 | 0.91 | 1.16 | 670 |
| Example 2 | 18.6 | 15.5 | 1.20 | 0.12 | 0.93 | 1.26 | 790 |
| Example 3 | 23.2 | 19.5 | 1.19 | 0.13 | 0.91 | 1.16 | 510 |
| Example 4 | 18.0 | 16.1 | 1.12 | 0.18 | 0.91 | 1.12 | 430 |
| Comparative Example 1 | 16.1 | 12.9 | 1.25 | 0.16 | 0.90 | 0.98 | 890 |
| Comparative Example 2 | 12.7 | 5.9 | 2.2 | 0.16 | 0.84 | 0.63 | 1210 |

TABLE 3

| No. | Initial Charge-Discharge Irreversible Capacity (mAh/g) |
|---|---|
| Example 1 | 32 |
| Example 2 | 27 |
| Example 3 | 31 |
| Example 4 | 32 |
| Comparative Example 1 | 39 |
| Comparative Example 2 | 41 |

As apparent from the results in Table 3, in Examples 1 to 4, the charge-discharge irreversible capacity in the initial cycle was small, whereas in Comparative Examples 1 and 2, the charge-discharge irreversible capacity in the initial cycle was large.

While the invention has been described in detail and with reference to specific embodiments thereof, it will be apparent to one skilled in the art that various changes and modifications can be made therein without departing from the spirit and scope thereof.

This application is based on the Japanese patent application filed on Jun. 27, 2005 (Patent Application No. 2005-186597), and the entire contents of which are incorporated herein by reference.

INDUSTRIAL APPLICABILITY

By virtue of using the graphite composite particle of the present invention, a negative electrode for a nonaqueous secondary battery, capable of giving an excellent nonaqueous secondary battery with a small charge-discharge irreversible capacity in the initial cycle, and a nonaqueous secondary battery can be stably produced with good efficiency. Therefore, the present invention is industrially very useful in the field of various nonaqueous secondary batteries.

The invention claimed is:

1. A graphite composite particle for a nonaqueous secondary battery, which satisfies the following requirements (1) and (2):

(1) $D_L/D_S$ is more than 1 and 2 or less, wherein $D_L$ μm means a volume-based median size which is measured by suspending 10 mg of the particle in 10 mL of 0.2 mass % polyoxyethylene sorbitan monolaurate aqueous solution, introducing the suspension into a commercially available laser diffraction/scattering-type particle size distribution measuring apparatus, and irradiating the suspension with an ultrasonic wave of 28 kHz at a power of 60 W for 1 minute, and $D_S$ μm means an average circle-equivalent particle size which is determined by selecting 100 particles each having a contour not overlapped with a contour of another particle at an observation using a scanning electron microscope, and determining an average value of the circle-equivalent particle size of the 100 particles determined from a measured area S of individual particles according to $2 \times (S/3.14)^{0.5}$; and (2) a Raman R value is 0.04 or more and 0.14 or less, wherein the Raman R value means an intensity ratio $I_B/I_A$ between an intensity $I_A$ of a maximum peak of 1580 cm$^{-1}$ around and an intensity $I_B$ of a maximum peak of 1360 cm$^{-1}$ around in a Raman spectrum.

2. The graphite composite particle for a nonaqueous secondary battery as claimed in claim 1, which has an average degree of circularity of 0.8 or more and 0.95 or less.

3. The graphite composite particle for a nonaqueous secondary battery as claimed in claim 1, which has a tap density of 0.7 g/cm³ or more and 1.5 g/cm³ or less.

4. The graphite composite particle for a nonaqueous secondary battery as claimed in claim 1, wherein the graphite composite particle has a structure where a calcined binder connects to at least a part of the graphite particle formed by calcining a carbonaceous particle.

5. The graphite composite particle for a nonaqueous secondary battery as claimed in claim 4, wherein the carbonaceous particle is a spheronized graphite.

6. A negative electrode active material for a nonaqueous secondary battery, comprising the graphite composite particle for a nonaqueous secondary battery claimed in claim 1.

7. The negative electrode active material for a nonaqueous secondary battery as claimed in claim 6, which further comprises one or more kinds of carbonaceous active material particles selected from the group consisting of natural graphite, artificial graphite, amorphous carbon coated graphite, resin-coated graphite and amorphous carbon.

8. The negative electrode active material for a nonaqueous secondary battery as claimed in claim 6, wherein an active material layer is formed by blending 100 parts by weight of the negative electrode active material, 2 parts by weight as a solid content of a water dispersion of styrene butadiene rubber, and 1 part by weight as a solid content of an aqueous solution of carboxymethyl cellulose having a weight average molecular weight of 250,000 to 300,000 to form an aqueous slurry; coating the aqueous slurry on a 18 μm-thick copper foil by using a doctor blade to have a dry film thickness of 10±0.1 mg/cm²; drying; and forming an active material layer having a width of 5 cm by using a roll press having a roller of 20 cm in diameter while adjusting a press load so as to have a density of 1.73±0.03 g/cm³ by pressing once, in which said press load is 200 kgf/5 cm or more and 1200 kgf/5 cm or less.

9. A negative electrode for a nonaqueous secondary battery, comprising a current collector and an active material layer formed thereon, wherein said active material layer is formed by using at least the negative electrode active material for a nonaqueous secondary battery claimed in claim 6.

10. A nonaqueous secondary battery comprising: an electrolyte; and positive and negative electrodes capable of occluding and releasing a lithium ion, wherein said negative electrode is the negative electrode for a nonaqueous secondary battery claimed in claim 9.

* * * * *